July 28, 1964 B. N. HOFFSTROM 3,142,452
STRAND HANDLING APPARATUS
Filed Aug. 22, 1961 4 Sheets-Sheet 1
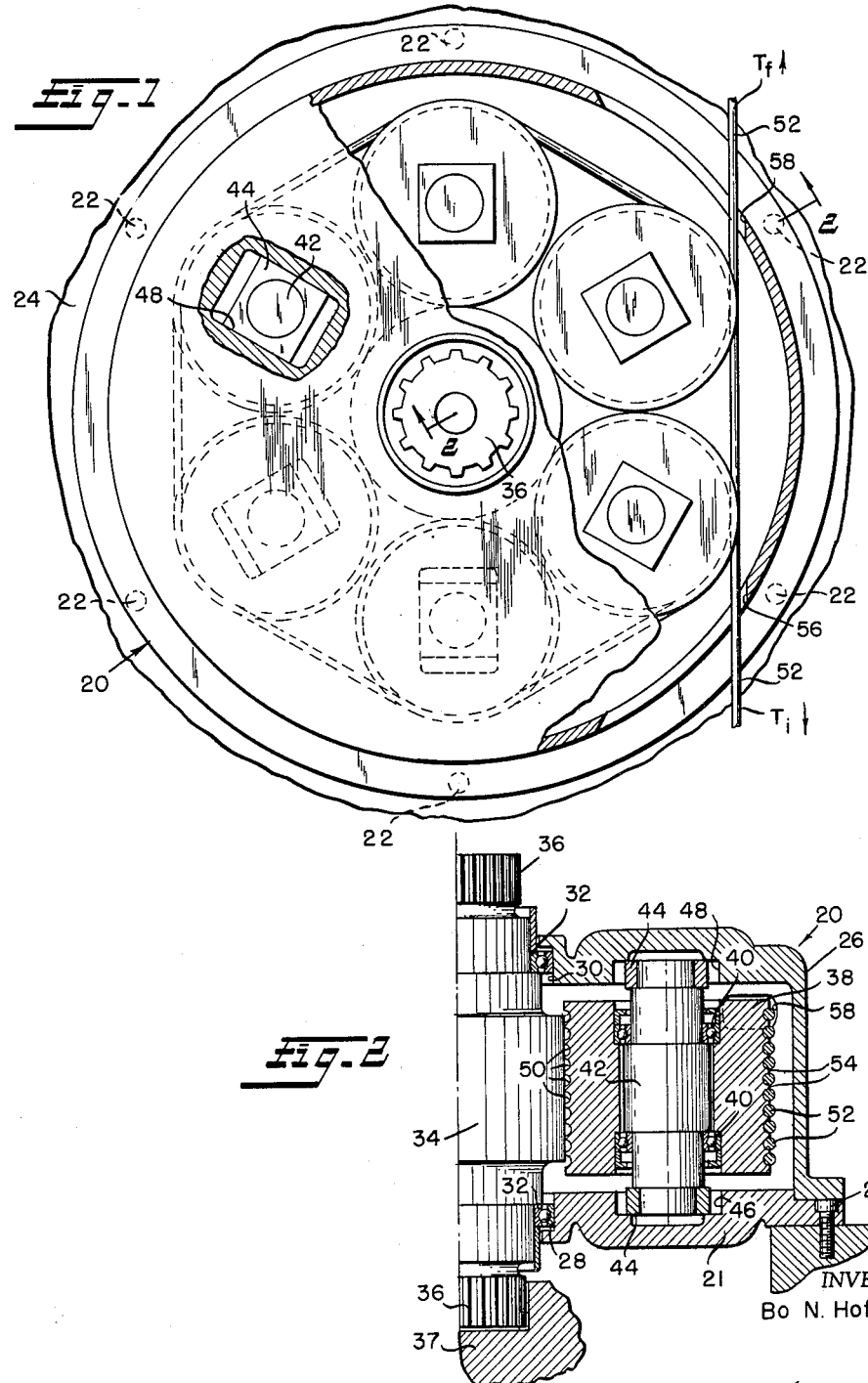
INVENTOR
Bo N. Hoffstrom
BY
ATTORNEYS

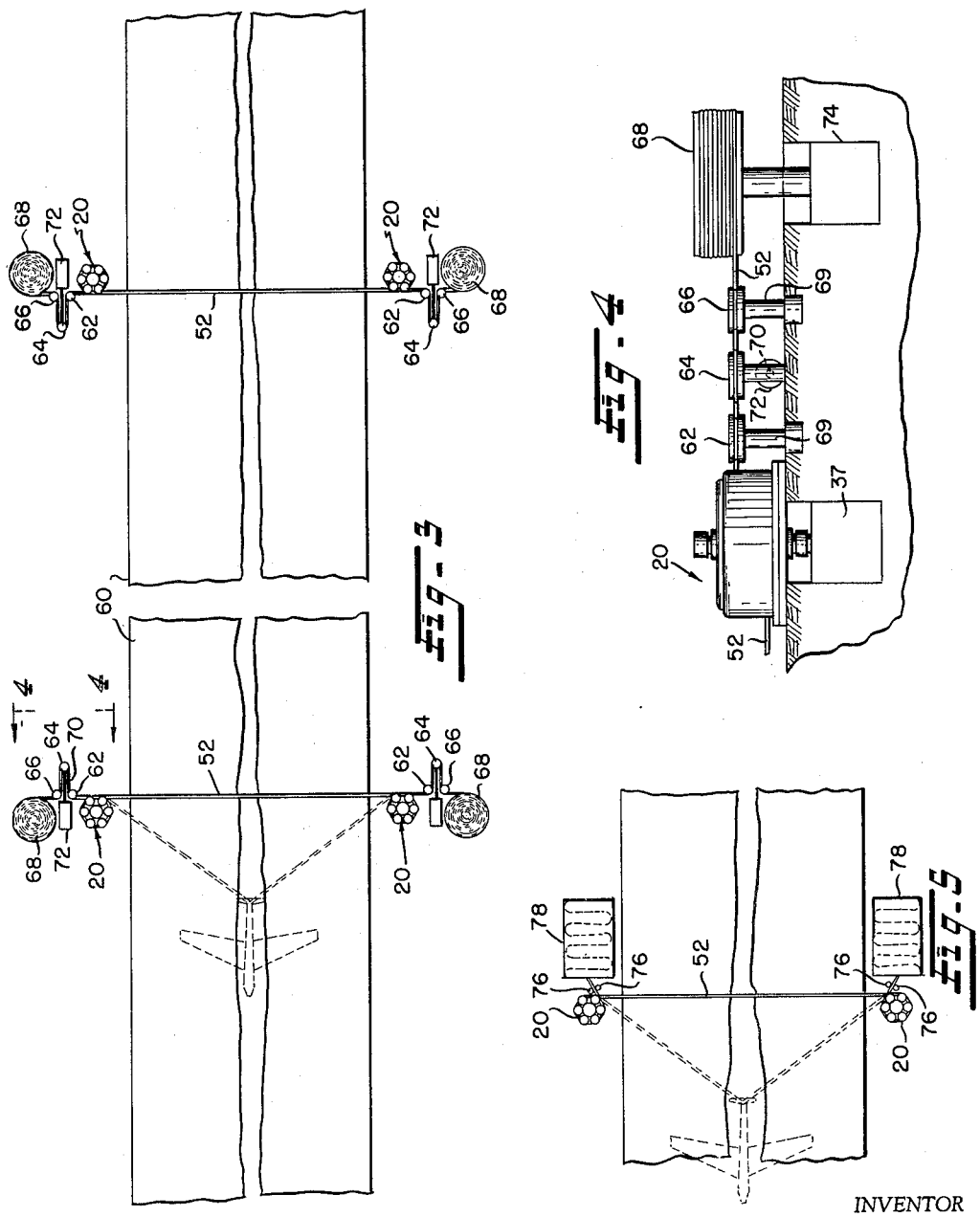

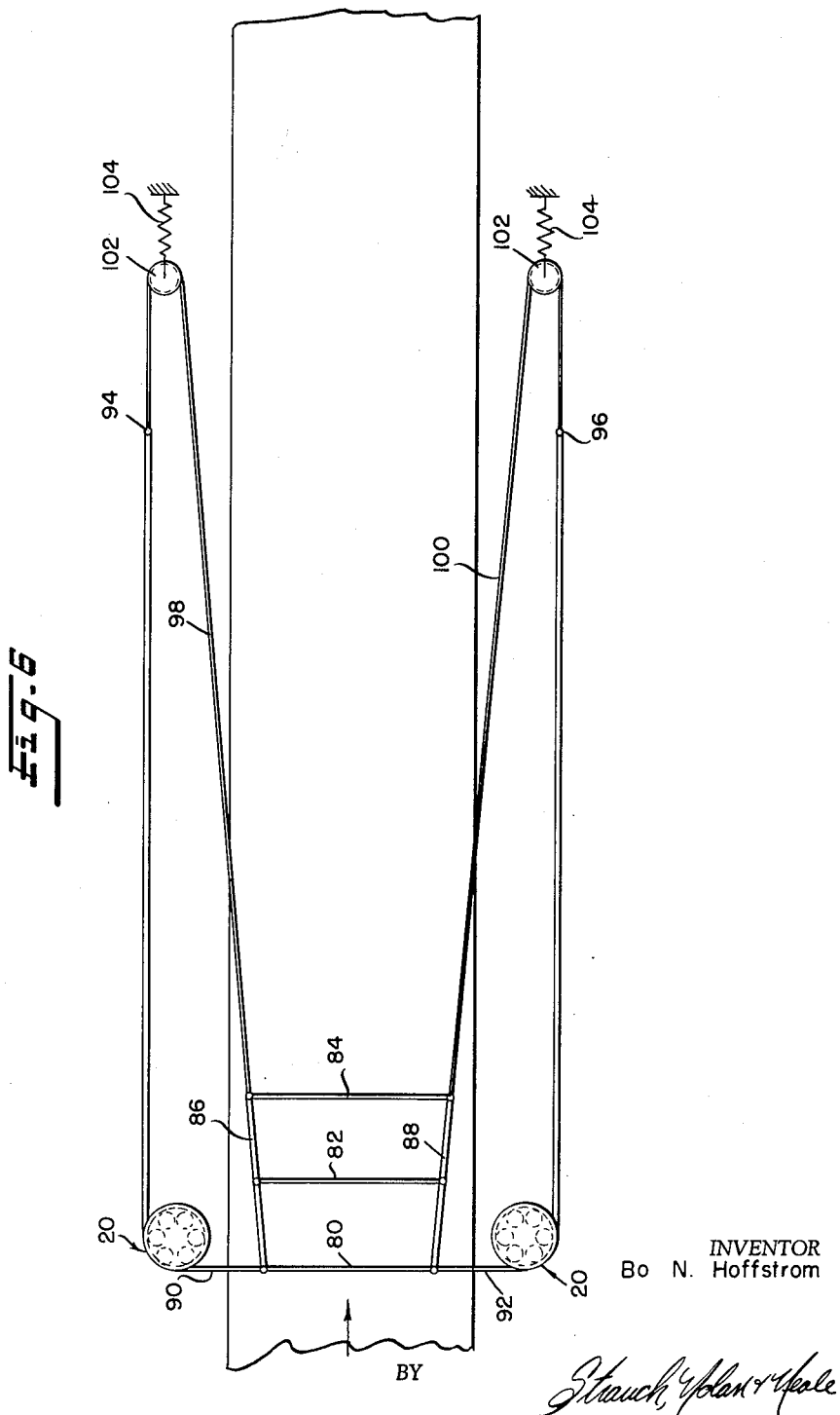

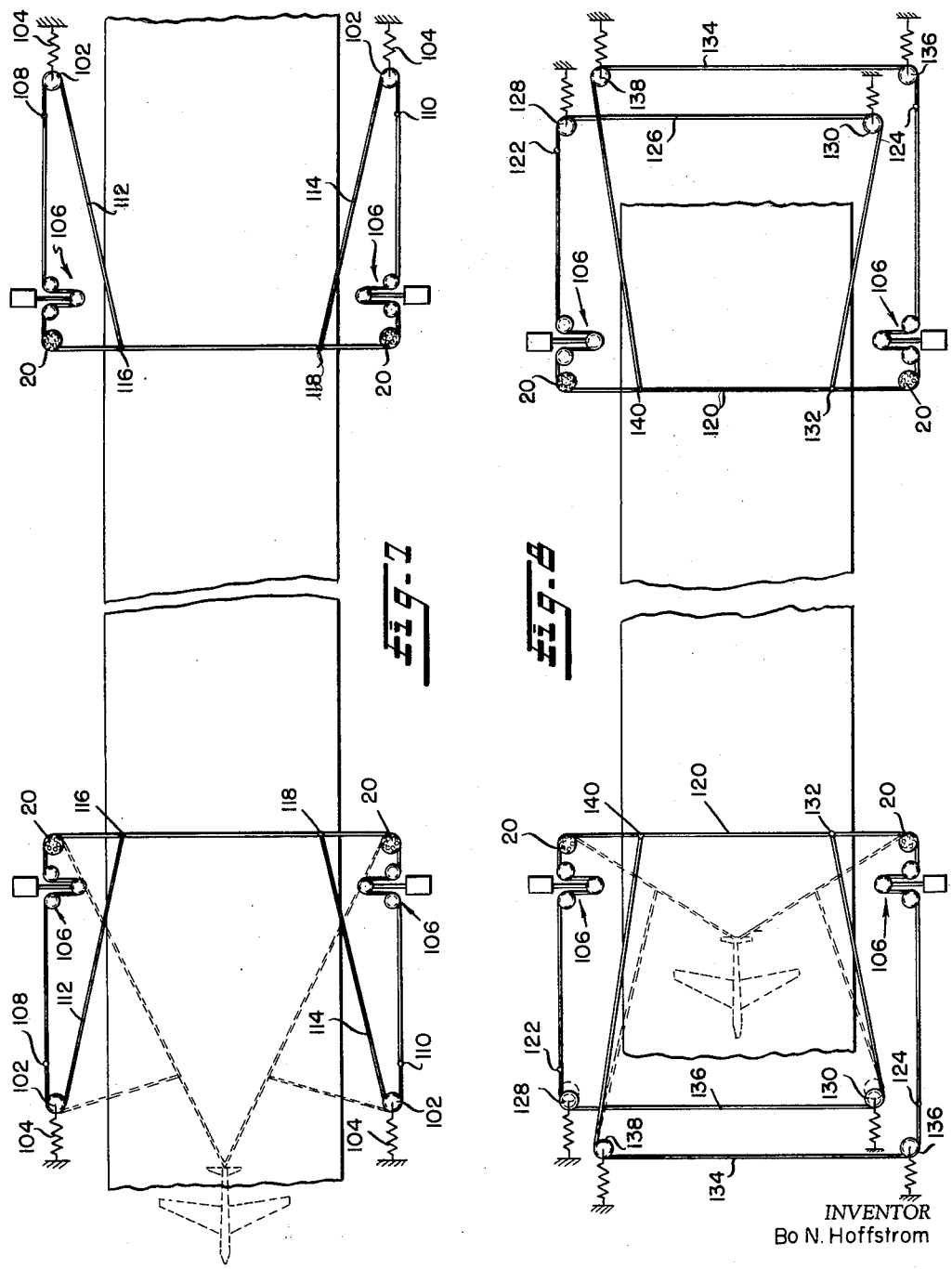

United States Patent Office 3,142,452
Patented July 28, 1964

3,142,452
STRAND HANDLING APPARATUS
Bo N. Hoffstrom, Santa Monica, Calif., assignor to Douglas Aircraft Company, Inc., Santa Monica, Calif.
Filed Aug. 22, 1961, Ser. No. 133,243
3 Claims. (Cl. 242—47.08)

This invention relates to apparatus for handling strands and more particularly to such apparatus especially adapted to pay out or reel in strands under very high loads. The strands may be in the form of cable or rope of round or rectangular section.

While the invention is of general application, it will be disclosed herein as a major component of an aircraft arresting system in which a strand is stretched across the runway under relatively high tension, the strand being engaged by the aircraft and rapidly paid out under high load from storage devices positioned at opposite sides of the runway.

In such installations the storage of the cable at opposite sides of the runway has created a problem of substantial magnitude, since in most prior installations the storage system also functions as a power absorber. For example, it has been proposed to store the cable on reels which are braked to permit the cable to be paid out at a controlled rate.

While the system has been used extensively, its application is subject to important limitations. For example, it imposes peak loads on the cable when the cable is engaged by the aircraft since the entire mass of the reel structure and of the cable which may be hundreds or thousands of feet long must be accelerated at a very high rate when the load is initially applied. Further, round strands such as steel cables or rope cannot be coiled on a drum under high load. Accordingly, if such strands are used, it has been necessary to wind them on a massive drum. The required very rapid acceleration of such a drum produces very high loads.

In accordance with the present invention, a novel capstan is interposed between the load and the storage device to decouple the load from the storage device and to permit the separation of the storage and braking functions. Broadly the capstan structure comprises a central rotor around which a group of rotatable rollers is positioned for radial floating movement. The strand is coiled about the group of rollers, the rollers transferring a portion of the load imposed by the strand to the central rotor and the remainder of the load to the capstan housing. The load on the portion of the strand between the capstan and the strand storage device is only a small fraction of the load imposed upon the strand by the aircraft. This load reduction permits the use of a variety of strand storage devices and the use of a strand of any desired material and configuration.

With these considerations in mind, it is the principal purpose and object of the present invention to provide improved capstan structures having unusually high load carrying capacity and resistance to wear despite their lightweight, compact construction.

It is a further object of the present invention to provide improved capstan structures adapted to accommodate a heavily loaded strand without the development in the capstan structure of high bearing loads invariably associated with prior structures.

It is also an object of the present invention to provide improved capstan structures for paying out or retrieving heavily loaded cables, the rate of which the cable is paid out being controlled by a braking system applied to the central rotor, the rotary speed of which is an inverse function of its diameter. Accordingly, by increasing or decreasing the diameter of the central rotor, its speed may be varied to adapt this system for use with a variety of braking devices for controlling the rate of rotation of the central rotor and thus the rate at which the cable is paid out.

It is a further object of the present invention to provide novel apparatus for storing and paying out long lengths of heavily loaded strands.

Additional objects and advantages of the present invention will become apparent as the description proceeds in connection with the accompanying drawings in which:

FIGURE 1 is a top plan view, partly in section, showing a preferred form of the capstan of the present invention.

FIGURE 2 is a vertical section taken along line 2—2 of FIGURE 1.

FIGURE 3 is a top plan view illustrating an aircraft retarding system incorporating the capstan of the present invention.

FIGURE 4 is an enlarged side elevation looking in the direction of arrows 4—4 in FIGURE 3; and FIGURES 5, 6, 7 and 8 are diagrammatic views which illustrate retarding systems utilizing modified strand storage devices.

Referring now more particularly to the drawings and especially to FIGURES 1 and 2, the capstan assembly indicated generally at 20 is enclosed in a two-part housing including a base member 21 suitably secured as by bolts 22 to a rigid foundation 24 and dish-shaped cover member 26 secured by means not shown to the base member 21. The base member 21 and the top cover member 26 are provided with aligned central openings 28 and 30, respectively, in which bearing assemblies 32 are mounted rotatably supporting a main rotor member 34 for rotation coaxially of the housing assembly. The central portion of the rotor is of enlarged cylindrical form to provide a smooth bearing surface of substantial area. The projecting ends of the rotor are splined as at 36 for attachment to a brake assembly 37 or other auxiliary apparatus. While the brake assembly may take a number of forms, it is preferably of the type described and claimed in co-pending application Serial Number 122,307, filed June 6, 1961, now Patent No. 3,093,352, for Power Absorbing Systems and Components. It will be understood that ordinarily only one end of the main rotor 34 will be connected to the brake. However, both ends of the rotor are splined to permit the installation of the brake as desired in accordance with the requirements of a particular installation and to permit the opposite to be attached to auxiliary apparatus used as a clutch or turbine.

Position around the main rotor at equally circumferentially spaced locations are six identical rollers 38. While the number of rollers may be varied, at least two rollers must be employed and it is preferable to employ three.

The rollers 38 are supported by bearings 40 carried by relatively heavy shafts 42, the opposite ends of which are non-rotatably received in slide blocks 44 positioned for sliding movement in slots 46 and 48 formed, respectively, in the base member 21 and the top cover member 26. As best shown in FIGURE 1, the slots extend radially of the main rotor 34. Accordingly, the rollers are mounted for free rotation about axes which are free to shift radially of the main rotor 34 but are locked against movement tangentially of the rotor. Many of the advantages of the invention are derived from this unique construction.

The otherwise smooth cylindrical surface of the rollers 38 may be interrupted by a plurality of parallel grooves 50 for reception of the cable 52. The grooves reduce cable wear but do not otherwise affect the operation of the mechanism. In the illustrated embodiment of the invention, the cable 52 is of circular cross-section. Accordingly, the grooves 50 are of corresponding section, the depth of the grooves being slightly less than the radius of the cable and the width of the grooves being slightly more than the diameter of the cable. The grooves are separated by lands 54 of substantial width, preferably not less than 1/3 of the diameter of the cable to preserve a substantial area of contact between the periphery of the rollers 38 and the periphery of the central portion of the main rotor 34. Also in the illustrated embodiment of the invention, ten grooves 50 are provided on each rotor. This number of turns is used to increase the effective angle of contact between the cable and the individual rollers to prevent slippage of the cable on the rollers. The grooves on each of the rollers are offset with respect to the grooves on the adjacent roller, a distance equal to $1/n$ times the width of the groove where $n$ is the number of rollers. Accordingly, the cable is wound about the capstan assembly in a helical path. The loaded cable strand enters the housing through an opening 56 adjacent the base of the cover member 26 and leaves the housing through an opening 58 adjacent the top of the housing. For some applications the openings 56 and 58 may be aligned to permit coplanar disposition of the loaded and unloaded portions of the cable. However, any other desired disposition of the openings may be employed. When the unit is employed in an aircraft retarding system, the opening 56 through which the loaded portion of the cable passes is circumferentially elongated. Alternately separate guide sheaves may be employed.

It is to be particularly noted that due to the mounting of the rollers 38 for free radial movement, the radial loads imposed by the rollers 38 on the central rotor 34 are balanced and are absorbed in compression internally of the rotor 34 and thus are not transmitted to the rotor bearings nor to the roller bearings 40. The moment loads on the bearings 40 acting in a direction circumferentially of the capstan are equally distributed between the rollers 38, the individual shaft loads being equal to twice the difference between the tension $T_l$ on the loaded portion of the cable and the tension $T_f$ on the unloaded portion of the cable divided by the number of rollers. The net translating load $T_l - T_f$ is absorbed by the bearings 32.

The introduction of the loaded portion of the cable at a point adjacent the bottom of the capstan also decreases the bending moments applied to the system thus permitting the use of lighter, smaller components.

The r.p.m. of the central rotor 34 is equal to the velocity in feet per minute of the cable 52 divided by pi times the diameter of the rotor in feet, since the capstan of the present invention functions essentially as a planetary gear system. Certain braking systems operate with greater efficiency at higher r.p.m. Accordingly, when the capstan assembly is to be used with such a braking system, the diameter of the central rotor will be made relatively small to increase its speed in operation. In the usual form of capstan the minimum rotor diameter is determined by a radius on which the cable may be bent. However, in the present case since the cable does not contact the central rotor, this limitation is not present.

FIGURE 3, to which detailed reference will now be made, illustrates a complete aircraft retarding system incorporating the capstan of the present invention. In this form of the invention two pairs of the capstans 20 are arranged at opposite ends of the runway to provide a pair of independent identical retarding systems to accommodate aircraft landing in either direction on the runway 60. The cable 52 is stretched between the capstan assemblies and passes from the capstan assemblies outwardly over rollers 62, 64 and 66 to a reel assembly 68 which may take any desired form since it is subjected only to a small fraction of the total cable load. For example, it may be of relatively lightweight construction and may provide for winding the cable layer upon layer. The rollers 62 and 66 are mounted for rotation about fixed axes on supports 69 while the roller 64 is rotatably supported on the projecting end of a piston rod 70 connected to a piston not shown reciprocably received in a fixed cylinder assembly 72. The roller 64 is normally urged to its extended position as shown in FIGURE 3 by a suitable hydraulic, pneumatic or mechanical spring apparatus received in the cylinder 72 to form a loop between the rollers 62 and 66. The reel 68 is rotatably supported by a brake-motor unit 74 which is preferably a hydro-dynamic unit of the same construction as the unit disclosed and claimed in co-pending application Serial Number 122,307, filed June 6, 1961, now Patent No. 3,093,352, for Power Absorbing Systems and Components, to which further reference may be made for details of construction. The unit 74 is effective to exert a slight drag on the reel 68 as the cable is unwound after engagement by an aircraft. During the retrieve cycle the unit 74 operates as a motor to rotate the reel 68 in the opposite direction. The unit 74 also may include a clutch mechanism which is effective at the end of the retrieve cycle to hold the reel 68 against rotation in a cable unwinding direction, the clutch being released by the application of increased tension to the cable 52 upon engagement of the cable by an aircraft as more fully explained in the aforesaid co-pending application Serial Number 122,307. The brake and drive units 37 associated with the capstans 20 are of similar construction but more powerful.

The system is ready for operation when the cable 52 is stretched across the runway as shown in full lines in FIGURE 1 under a substantial degree of pretension. The pretension is maintained in the cable 52 by the clutch units associated with the mechanisms 37. It is to be understood that the unit 37 is of much larger capacity than the unit 74 so that the former exerts the principal drag as the cable is unwound upon engagement by an aircraft and exerts the principal drive force in the cable retrieving direction. The capacity of the unit 74 may be as little as $1/50$ of the capacity of the unit 37. It will be noted that when the system comes to rest as shown in FIGURE 3, the tension imparted to the cable 52 by the retrieve motor 74 is not sufficient to prevent the formation of a loop of substantial size by the mechanism 72.

When the cable is engaged by the aircraft, the capstans 20 immediately begin to revolve. The portion of the cable at the opposite side of the capstan also begins to move rapidly reducing the size of the loop formed by the roller 64, while the reel mechanisms 68 are being accelerated. This arrangement effectively decouples the relatively large mass of the cable reels 68 from the initial engagement shock and permits more gradual acceleration of the reels 68 without inducing undue stress in the cable 52. When the aircraft has completed its runout, the cable is disengaged and returned to the position shown in full lines in FIGURE 3 by the units 37 and 74.

FIGURE 5 illustrates a modified form of arresting system which differs from the system of FIGURE 3 principally in the cable storage means. In this form of the invention the cable 52 is stretched between capstan assemblies 20 positioned at opposite sides of the runway, the disposition of the units being the same as that of FIGURE 3. Beyond the capstan assemblies 20, the cable is fed through pairs of rotors 76 which frictionally engage the cable 52 and are effective to exert a slight drag on the cable when it is paid out during aircraft engagement and which may be provided with suitable drive means (not shown) for moving the cable in a retrieve direction. The main body of the cable, beyond the rollers 76, is positioned loosely in storage containers 78 the height of which is slightly greater than the cable diameter. This storage system completely eliminates the problem of inertial cable loading upon engagement of the cable by an aircraft, since only a small portion of the main body of the cable need be rapidly accelerated at that time.

FIGURE 6 illustrates a further modification of the invention in which the cable system includes multiple pendants 80, 82 and 84 to provide an additional safety factor. The pendants, which are preferably of steel cable, are secured at their opposite ends to short cable sections 86 and 88 which extend from the main cable sections 90 and 92 to the point of attachment of the pendant 84. The main cables pass through the capstans 20 positioned at opposite sides of the runway and are attached at their opposite ends as at 94 and 96 to relatively light trailer cables 98 and 100. The cables 98 and 100 pass around identical pulleys 102 suitably supported by tensioning springs 104. At their opposite ends the cables 98 and 100 are attached to the respective cable sections 86 and 88. Since the relatively long trailing cables 98 and 100 are subjected to only a fraction of the load imposed on the pendants and the main cables, they may be made relatively light thus decreasing the mass and inertia of the entire system thereby substantially reducing the initial shock load imposed upon the main cable sections during the arresting operation. It is to be understood that the capstans are associated with the brake-motor mechanisms in the same manner as that described in connection with FIGURE 3, the arrangement being such that the main cable is paid out at a controlled rate and subsequently rapidly retrieved and pretensioned. It is also to be noted that in this form of the invention, as contrasted with the systems of FIGURES 3 and 5 it is not necessary to employ a separate braking system to develop tension in the trailing or unloaded portion of the cable. The necessary tension is developed by the springs 104 which effectively load the trailer cables to the extent required both during the arresting and retrieve operations.

The unit shown in FIGURE 6 may be duplicated at the opposite end of the runway as in the case of the systems of FIGURES 3 and 5.

The system of FIGURE 7 is essentially the same as that of FIGURE 6 except for the elimination of the additional pendants and the inclusion of the shock absorber mechanisms 106, which are the same as those shown in FIGURE 3. In this form of the invention the main cable extends from point 108 to point 110. The relatively light trailer cables 112 and 114 extend respectively from points 108 and 110 to points 116 and 118 where they are attached to the main cable.

The system of FIGURE 8 differs from the arrangement of FIGURE 7 principally in the disposition of the trailer cables. In this form of the invention the main cable 120 extends from a point 122 through the shock absorber system 106 around the capstan 20 across the runway, over the opposite capstan 20, through the opposite shock absorber assembly 106 to the point 124. At the point 122 the main cable 120 is attached to a relatively light trailer cable 126 which passes over spring loaded pulleys 128 and 130 to its point of attachment 132 to the main cable. At the point 124 the main cable is attached to a second relatively light trailer cable 134 which passes over spring loaded pulleys 136 and 138 to its point of attachment 140 to the main cable. This system has an advantage over the other forms of the invention in that it assures exact synchronization of the movements of the two capstans 20 at the opposite sides of the runway. The points 132 and 140 which are initally in a plane normal to the runway retain this relationship throughout the engagement period thus developing a steering effect which may be desirable under certain circumstances.

An of the systems described above may also be used for launching aircraft. For such use the strand system is moved, for example by a tractor or other separate power source, to approximately the position it occupies at the end of an arresting cycle. The central portion of the strand is then suitably attached to an aircraft and the capstan drive unit and associated mechanisms are operated in a strand retrieving direction.

The load distribution is essentially the same as that described for the arresting cycle, minimum loads being imposed on the strand storage devices.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A capstan assembly comprising a main rotor, a plurality of rollers equally spaced around the periphery of said main rotor, peripheral portions of each of said rollers being in rolling contact with the periphery of said main rotor, means mounting said rollers for rotation about axes which are shiftable radially of said main rotor, said mounting means preventing movement of the axes of said rollers circumferentially of said main rotor, said rollers having peripheral surfaces for engaging a strand.

2. A capstan assembly comprising a housing, a main rotor having a central cylindrical body portion, means mounting said rotor in said housing for rotation about a fixed axis, a plurality of rollers, means in said housing supporting said rollers in equally-spaced relation around the periphery of said main rotor, said rollers having cylindrical body portions in rolling contact with the cylindrical body portion of said main rotor, said mounting means supporting said rollers for rotation about axes which are parallel to the axis of rotation of said main rotor and for bodily shifting movement toward and away from the axis of the main rotor while preventing movement of the axes of said rollers circumferentially of said main rotor, said rollers having peripheral surfaces for engaging a strand.

3. A capstan assembly comprising a housing, a main rotor, means in said housing supporting said main rotor for rotation about a fixed axis, said rotor having a central cylindrical body portion, a plurality of rollers, a plurality of shafts rotably supporting said rollers, means forming guide surfaces in said housing extending radially of the axis of said main rotor, slide blocks received in said slots and rotatably supporting said shafts to dispose said rollers in rolling contact with the body portion of said main rotor and permitting the axes of said shafts to shift radially of the axis of said main rotor while preventing the displacement of said rollers circumferentially of said main rotor.

References Cited in the file of this patent

UNITED STATES PATENTS

| 1,661,275 | Stensland | Mar. 6, 1928 |
| 2,362,910 | Littman | Nov. 14, 1944 |
| 2,971,727 | Haber | Feb. 14, 1961 |
| 2,987,278 | Hoffman et al. | June 6, 1961 |